United States Patent
Stoelinga et al.

[19]

[11] Patent Number: 5,816,975
[45] Date of Patent: Oct. 6, 1998

[54] DEVICE FOR AUTOMATIC CONTROL OF A CLUTCH

[75] Inventors: Dirk-Jan Stoelinga, Postbus; Jan Paul Wijlhuizen, Arnhem, both of Netherlands

[73] Assignee: T.C. Patent B.V., Arnhem, Netherlands

[21] Appl. No.: 687,478

[22] PCT Filed: Feb. 6, 1995

[86] PCT No.: PCT/NL95/00053

§ 371 Date: Sep. 13, 1996

§ 102(e) Date: Sep. 13, 1996

[87] PCT Pub. No.: WO95/21071

PCT Pub. Date: Aug. 10, 1995

[30] Foreign Application Priority Data

Feb. 4, 1994 [NL] Netherlands .......................... 9400183

[51] Int. Cl.⁶ ................................................. B60K 41/02
[52] U.S. Cl. .............................. 477/89; 477/83; 477/181
[58] Field of Search .................................. 477/83, 87, 89, 477/181; 74/471 R, 479.01, 480 R

[56] References Cited

U.S. PATENT DOCUMENTS

| | | | |
|---|---|---|---|
| 1,893,644 | 1/1933 | Fleischel | 477/87 |
| 2,103,700 | 12/1937 | Smart | 477/181 |
| 2,325,486 | 7/1943 | Derungs | 477/83 |
| 2,414,717 | 1/1947 | Chapman | 477/181 |
| 2,916,937 | 12/1959 | Iavelli | 477/83 |
| 2,983,346 | 5/1961 | Weymann | |

FOREIGN PATENT DOCUMENTS

| | | |
|---|---|---|
| 0 224 454 | 6/1987 | European Pat. Off. . |
| 59-013155 | 1/1984 | Japan . |

OTHER PUBLICATIONS

Scott, D., "Footloose", *Popular Science*, vol. 232, No. 3, Mar. 1988, pp. 64–65.

*Primary Examiner*—Rodney H. Bonck
*Assistant Examiner*—Sherry Lynn Estremsky
*Attorney, Agent, or Firm*—Young & Thompson

[57] ABSTRACT

A device for the automatic control of a clutch, in particular of vehicles in which the degree of clutch engagement is determined by the position of an accelerator of the vehicle, such as an accelerator pedal or handle. The device includes an actuation member connected to the clutch and two movable elements whose positions are associated with the degree of clutch engagement of the vehicle and the position of the accelerator, respectively. The movable elements include a switch for making or breaking an electric contact in dependence on the positions of the elements relative to one another.

24 Claims, 4 Drawing Sheets

DEVICE FOR AUTOMATIC CONTROL OF A CLUTCH

The invention relates to a device for the automatic control of a clutch, in particular a clutch of a motor vehicle, comprising an actuation member for automatically controlling the clutch at least during operation, whether or not through the agency of a clutch pedal or handle.

Such a device is of major advantage especially when it is necessary to stop and drive on frequently at comparatively short intervals in between over short distances such as is the case, for example, with refuse lorries, mobile shops and the like. The drivers thereof often have knee complaints caused by the frequent operation of the clutch pedal. The actuation member relieves the load on the driver's leg.

Devices of the kind mentioned in the opening paragraph are known in particular from vehicles fitted with an automatic gearbox. The constructions used for this are usually so-called torque converters which comprise two mutually opposed discs which rotate in an oil-filled space and which face one another with their hollow sides, in which blades are provided. These, however, are comparatively complicated and expensive constructions which must be fitted during the manufacture of the vehicle Simpler systems are also known, but in these simpler systems a certain measure of control over the clutch is always sacrificed in the sense that the degree or speed of clutch engagement is previously defined and the driver can hardly influence this during operation, if at all. This is inconvenient not only when a different style of driving, for example a more sportsmanlike one than preset, is desired, but it may also lead to unsafe situations in those cases where a quick acceleration is the only way out of a hazardous situation.

As such EP 224.454 describes an automatic clutch arrangement in which the position of the clutch pedal is controlled by a gear motor and micro switches associated with the driving belt of the clutch pedal provide for the necessary end point detections. During normal, automatic operation, after a specific gear has been set, the gear motor initially raises the clutch pedal slowly until the so-called engage or skidding point is reached. At that instance a further micro switch activates a rheostat causing the ascent rate to be decreased so that the friction plates may nicely and smoothly come from further to full engagement. However if the driver wants a more sport-like way of driving he presses the accelerator pedal in order to activate another micro switch which short-cuts the rheostat causing the clutch pedal to ascent all the way at the same relatively high rate.

A similar kind of operation is disclosed in U.S. Pat. No. 2,983,346 in which normal, automatic operation of the clutch is guided by first switching means associated with an actuating rod, which provide for clutch engagement in three consecutive stages: first rapid to the skidding point where the friction plates start to engage, then gentle towards full engagement and finally rapid again to full ascent. In order to skip the gentle stage the driver just has to press the accelerator pedal in order that terminal of switching means associated with it will land on the isolating portion, interrupting the connection to a conducting portion of the first switching means.

However, although these known automatic clutch arrangements facilitate in one way or the other some kind of interference with the standard clutching procedure through the action of the accelerator pedal, they both provide nothing more than merely a choice between either of two pre-programmed scenarios, which in practice appears to be absolutely insufficient to adequately tackle all kinds of different circumstances which may occur during daily traffic. Accordingly a lot over user control is sacrificed in these known system to the benefit of automatic operation.

The present invention has for its object inter alia to provide a device of the kind mentioned in the opening paragraph which permits at least a high degree of user control over the degree and rate of clutch engagement.

The invention is based on the recognition that this may be achieved by means of a device in which the degree of clutch engagement can be governed by the position of the speed control of the vehicle, such as an accelerator pedal or handle, so that declutching can take place quickly and the clutch can be brought into the crawling position quickly again, after which further letting-in of the clutch may take place as quickly as desired, dependent on the speed or degree of depression of the accelerator.

Another object of the invention is to provide a simple but effective device which can be mounted on any vehicle having a normal clutch at a comparatively low cost.

To achieve the above objects, according to the invention, a device of the kind mentioned in the opening paragraph is characterized in that the device comprises a first movable element whose position is associated with the position of a speed control of the motor, in that the device comprises a second movable element whose position is associated with the degree of clutch engagement, and in that said two movable elements comprise switching means capable of cooperating so as to make or break an electrical connection in dependence on the relative positions of the elements. Since the switching means according to the invention thus effect a relation between the degree of clutch engagement and the degree to which speed is provided, a control over the clutch on the basis of the speed or the degree to which speed is provided is always possible. The device may operate through the agency of the existing clutch pedal, so that no special adaptations are necessary and the device may be built into practically any vehicle in a simple manner. Maintaining the existing clutch pedal in the vehicle conserves the possibility of operating the vehicle in the normal way, which contributes to its safety especially with a view to a possible defect in the system.

Since the degree of clutch engagement in the device according to the invention is determined by the positions of the two movable elements relative to one another, a preferred embodiment of the device according to the invention is characterized in that the switching means are provided so as to be mutually adjustable. The device can be properly set in that case and can also be tuned afterwards whenever necessary, for example, because of wear of the various components.

The switching means need indeed not be in actual physical contact with one another. A special embodiment of the device according to the invention is characterized in that the switching means comprise an optocoupler on the one movable element and a flat plate on the other movable element, and in that the flat plate is capable of crossing a light path in the optocoupler in dependence on the relative positions of the elements. Wear of the switching means is thus minimized through the avoidance of physical contact therein.

The actuation member used may be of various types, for example a hydraulic motor, an electric motor, or a pressure cylinder, hydraulic or pneumatic.

According to a characteristic of a device in accordance with the invention, the actuation member is formed by a pressure cylinder operated by electromagnetic valves.

An advantageous solution is offered by an electric motor because the power source for this is already present in the form of a battery. A further embodiment of a device according to the invention is characterized in that the actuation member is an electric motor and the transmission is formed by a threaded end of the motor shaft, or a threaded bush fastened to the motor shaft, with a nut driven thereby, rotation of said nut being prevented by a guide extending parallel to the motor shaft.

According to a further embodiment of a device in accordance with the invention, the actuation member is an electric motor and the transmission comprises a wormbox on whose output shaft a chainwheel is mounted which drives a chain connected to a connection piece at its one end, while the other end of the chain is connected to a resilient element which keeps the chain taut.

The advantage of such a construction is that standard components can be used.

A further embodiment of a device according to the invention is characterized in that the ends of the chain are connected to the one end of a first lever and to the one end of a second lever, respectively, for guiding purposes in each case, which levers are rotatable at their other ends about a, preferably shared, pivot point.

A better guiding of the chain is obtained thereby, so that a reliable contact is achieved between a contact track on the movable element and the contact present on the connection piece.

Yet another embodiment of the device is characterized in that the resilient element is a pneumatic spring connected to the second lever.

The advantage of this is that the portion of the chain connected to the second lever is immediately tautened during declutching and moves back with damping action during clutching.

Still another embodiment of a device according to the invention is characterized in that the first limit switch is operated by the movable nut or the second lever when the clutch is let in, and the second limit switch is thus operated when the clutch is depressed.

A further characteristic of a device according to the invention is that the movable element comprises a flat strip of an insulating material which is guided between two rods in its longitudinal direction, which corresponds to the direction of movement of the connection piece, the surface facing the connection piece carrying the contact track.

The advantage of this is that the connection with the contact track can be achieved in a simple manner via the spring which keeps the movable element in its first position without the risk of malfunctions.

The invention will now be explained in more detail with reference to two embodiments and a drawing, in which.

The drawings are purely diagrammatic and not drawn to scale. Some dimensions are particularly exaggerated for the sake of clarity.

Figure 1:
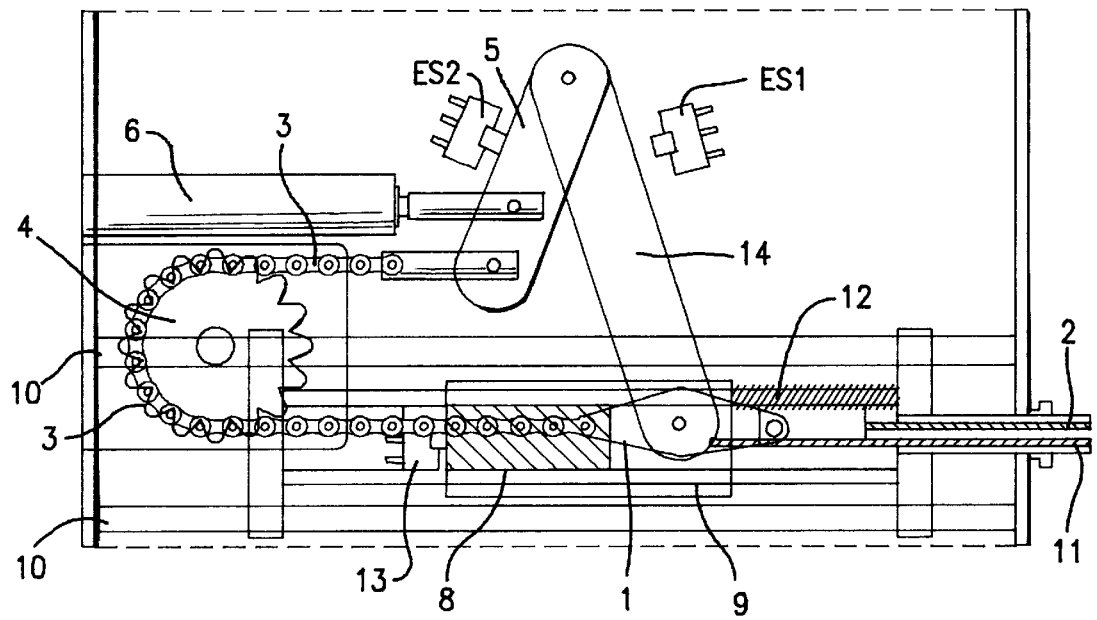
FIG. 1 is a plan view of a first embodiment of the device according to the invention with the clutch engaged.

In FIG. 1, the connection piece 1 is connected to the clutch cable 2, which leads directly to the clutch or to the clutch pedal (not shown). The other end of the connection piece 1 is fastened to a chain 3 which is guided around a chainwheel 4 and whose other end is connected to a first lever 5 and, via this lever 5, to a resilient element 6 constructed as a pneumatic spring which keeps the chain 3 taut. The chainwheel 4 is driven by an actuation member 7 provided with a self-braking transmission during clutching and declutching.

A movable element 9 provided with a contact track 8, here a flat strip of insulating material guided by two rods 10 in its longitudinal direction, i.e. the direction corresponding to the direction of movement of the connection piece 1, is fastened to an accelerator cable 11 and is held by a spring 12, constructed as a compression spring here, in a first position when the accelerator pedal is released, in which position it depresses a second switch 13, whereby the actuation member is blocked.

Figure 2:
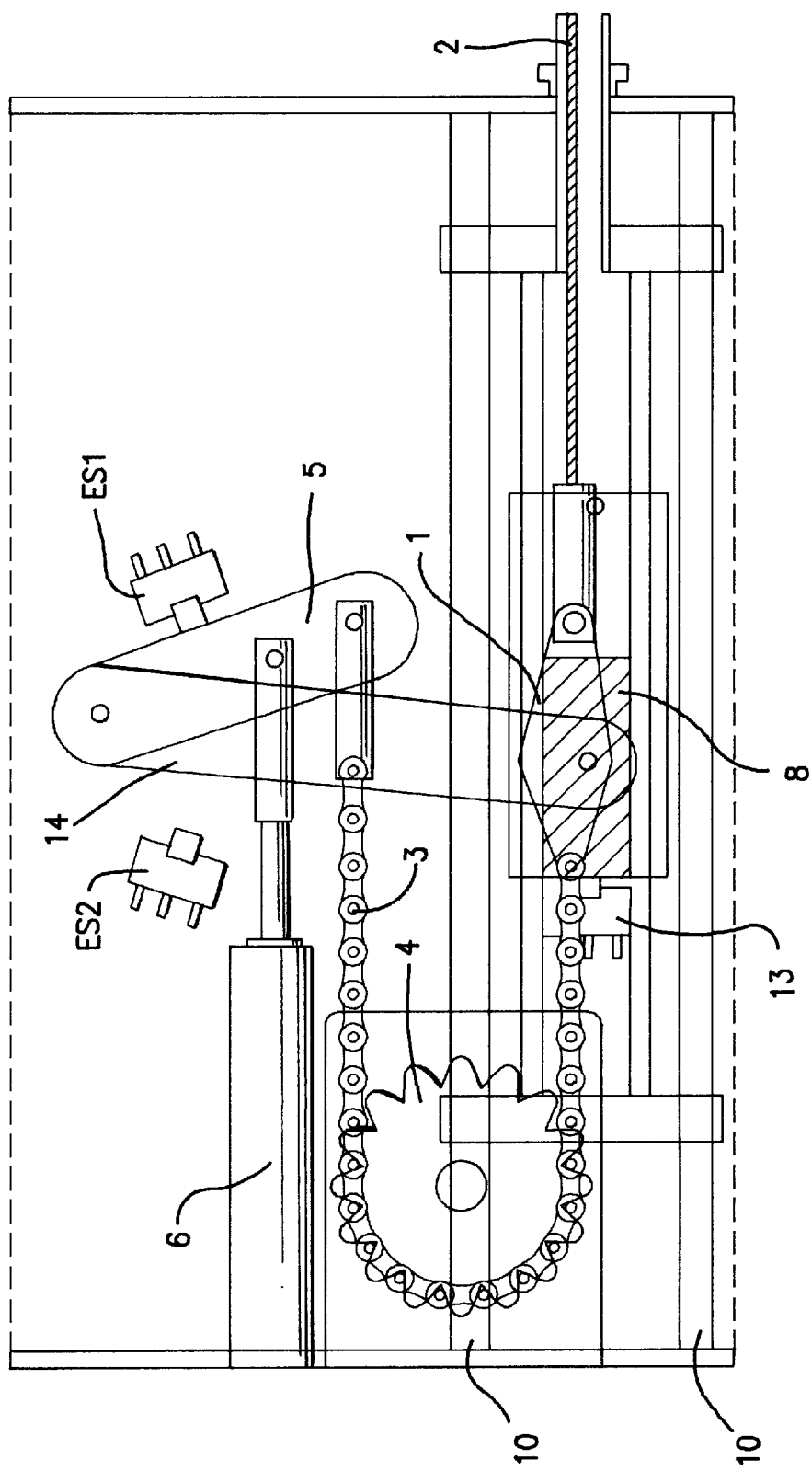
FIG. 2 is a plan view of the device of FIG. 1 with the clutch disengaged.

A first limit switch ES1 is depressed by the first lever 5 when the clutch pedal is depressed, as is drawn in FIG. 2, and then switches off the actuation member 7, whereas a second limit switch ES2 is depressed when the clutch is let in, thus also switching off the actuation member 7, as shown in FIG. 1.

The connection piece 1 is rotatably fastened to a second lever 14, which here consists of two parts. The journal 15 is hollow and provided with insulation at its inside, where the contact 16 is resiliently mounted so as to make contact with the contact track 8 in the declutched state.

Figure 4:
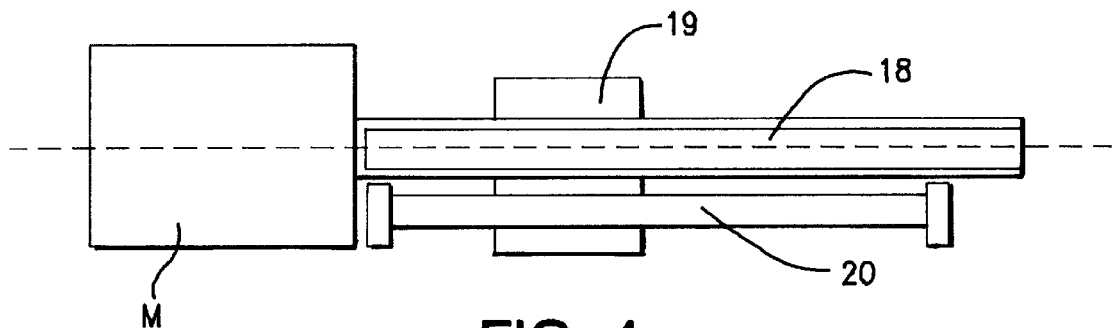
FIG. 4 shows a drive with screwthread and nut for the device of FIG. 1.

FIG. 4 shows an actuation member comprising an electric motor M whose output shaft is provided with screwthread 18 over which a nut 19 can move to and fro.

The nut 19 is guided by sliding along a guide 20 which extends parallel to the motor shaft to prevent co-rotation of the nut.

Figure 3:
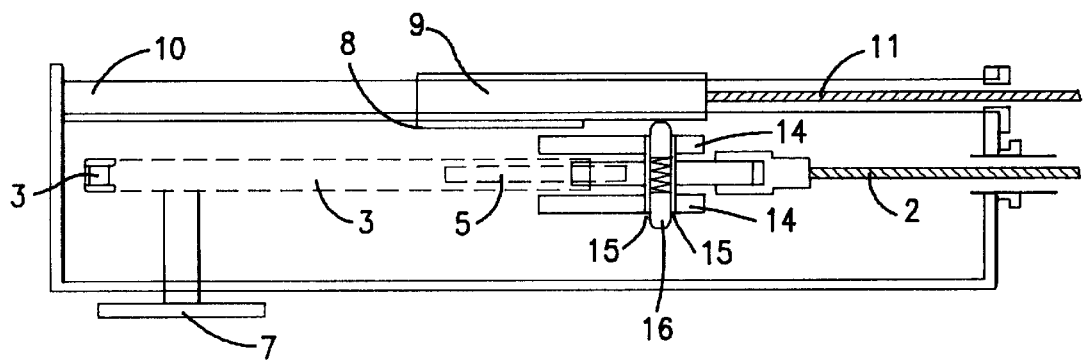
FIG. 3 is a partial side elevation of FIG. 1.
Figure 5:
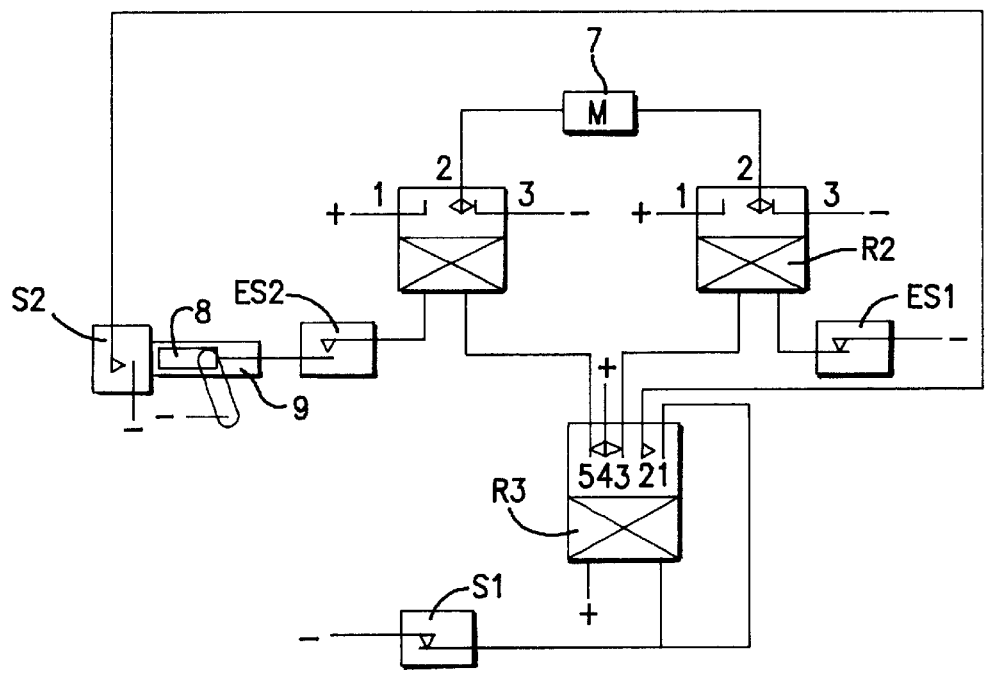
FIG. 5 is a possible circuit diagram of the drive of the device of FIG. 1.

FIG. 5 shows a possible circuit diagram for controlling a device according to the invention with the clutch fully engaged. The operation will now be described with reference to FIGS. 1 to 3 and the diagram of FIG. 5.

Pressing of the first switch S1 energizes the relay R3, so that relay R2 is also energized and contact is made between 1 and 2, whereby the motor M of the actuation member 7 moves in the first direction and pulls the clutch cable 2 until the first lever 5 opens the first limit switch ES1, upon which the relay R2 drops out, the contact 1–2 is broken, and motor M stops. When the accelerator cable is released, switch S2 is closed and keeps relay R3 energized via contacts 1 and 2 thereof. When the accelerator pedal is pressed, however, and the movable element 9 is pulled away, S2 is broken so that the relay R3 drops out, its contacts 1 and 2 are broken, and contacts 4 and 5 are closed; and since declutching has pivoted the first lever 5 away from the second limit switch ES2, so that the contacts thereof are closed, the motor M is driven in reverse direction via contacts 16 and contact track 8 until the second lever 14 has been turned back so far that the contacts 16 leave the contact track 8, and the motor M stops in a position in which the vehicle crawls. When the accelerator is opened further, motor M will start running again and the clutch will be let in further until the contacts of the second lever 14 leave the contact track 8 again and the motor M stops once more.

It is thus possible with a minimal effort to operate the clutch and obtain a desired dosing of the vehicle's speed.

Figure 6:
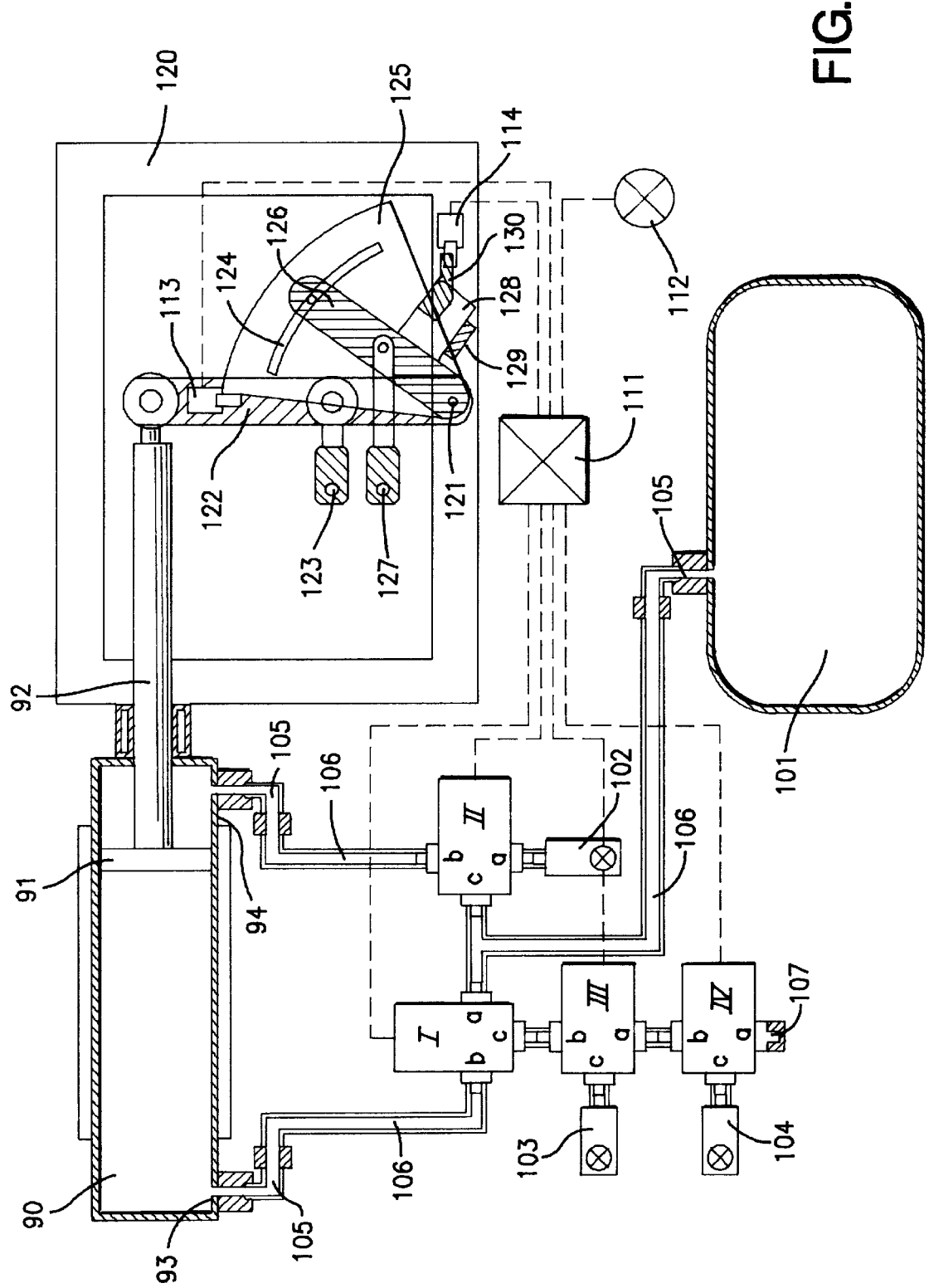
FIG. 6 shows a second embodiment of the device according to the invention.

Instead of the electromechanical action by a relay and an electric motor as in the above example, it is alternatively possible to implement the invention electropneumatically by means of pneumatic valves. This is diagrammatically depicted in FIG. 6, which shows a second embodiment of the device according to the invention.

The device in this case comprises a pneumatic cylinder 90 with a piston 91 and a drive rod 92 coupled thereto. The cylinder 90 may be fed from a buffer vessel 101 and is controlled by a central control unit 111 and four pneumatic threeway valves I . . . IV, having respective outputs a.c. The cylinder 90 comprises on either side a combined inlet/outlet 93, 94 coupled to a first valve I and a second valve II, respectively, via suitable connectors 105 and lines 106.

The buffer vessel 101 is connected between these two valves I, II by means of a T-piece 104, so that the cylinder 100 can be operated via the two valves I, II. The remaining outlet a of valve II is in communication with the ambient air through a reducing valve 102. The remaining outlet of the first valve I is connected to the third and fourth valves III and IV in series, which can communicate with the ambient air via respective reducing valves 103 and 104. The first reducing valve 103 is practically open here, whereas the second 104 is set for a very narrow passage. The remaining outlet a of the fourth valve IV is closed hermetically against the air by means of a suitable cap 107.

The system is started by means of an actuation switch 112 in the vehicle cabin. The control unit 111 then opens the first valve I and the second valve II, both via path a–b, so that the pressure of the buffer vessel 101 is applied to the cylinder 90 via the inlet 93, and air will leave the system through outlet 94, valve II and reducing valve 102. The other two valves III and IV remain closed.

The piston 91 and drive rod 92 are thus driven into their extreme positions as drawn, while the speed with which this takes place is determined by the resistance offered by the reducing valve 102. The drive rod 92 is coupled at one end to a first lever 122 which hinges about a fixed point 121 of a frame 120 and which is coupled to the clutch of the vehicle by means of a connection 123, possibly but not necessarily via the clutch pedal. The movement of the piston 91 thus disengages the clutch. The end station of this is determined by means of an optocoupler 113 which provides an electric signal to the control unit 111 the moment its light path is interrupted by a metal plate 125. This causes the first valve I, the second valve II, and the third valve III to be opened, all via path b–c, so that the pressure will be fully applied to the right-hand side of the piston 91, and air will leave the system through reducing valve 103 until the piston 91 has been driven back so far that the light path of the optocoupler 113 is free again. When that is the case, the third valve III is closed, and so is the fourth valve IV, if it was open, i.e. the system has returned to its fully declutched initial position as drawn.

The metal plate 125 is provided on a second ever 126 which also hinges about the point 121 and is connected to the accelerator pedal or handle of the vehicle via a connection 127. The plate is adjustable on the lever 126 by means of a slot 124 provided in this plate, so that the declutching end position can be set as desired.

The second lever 126 is held in the position drawn by a spring (not shown), the lever 126 resting with a transverse piece 128 against a stop 129 of the frame 120. A vane 130 mounted on the transverse piece here interrupts a light path in a second optocoupler 114 which is mounted to the frame 120.

The moment the accelerator is depressed, so that a pulling force is exerted on its connection 127, the second lever 126 will be moved counterclockwise so that the vane 130 frees the light path in the second optocoupler. As a result of this, the control unit 111 opens the first valve I, the second valve II, and the third valve III, all via path b–c, while the fourth valve does or does not remain open. In that case the piston 91 and the drive rod 92 will be driven into the cylinder 90 again owing to the pressure building up at the right-hand side of the piston 91 now and leaving the cylinder 90 through reducing valve 103. Since the reducing valve 103 is comparatively wide open, this will take place comparatively quickly, and the clutch will be brought comparatively quickly into the engagement position in which the clutch barely engages, i.e. the vehicle in brought into the crawling mode. At this moment the third valve III is closed and the fourth valve IV is openend so that from then on the air can leave the system through reducing valve 104 only. Since this valve 104 is comparatively narrow in comparison with valve 103, the clutch will be let in very cautiously and slowly until the clutch engagement is a maximum. It is avoided in this manner that the vehicle's motor is throttled down and stalls and that the vehicle starts jolting.

According to the invention, the positions of the clutch and of the accelerator are mutually coupled through the optocoupler 113 and the metal plate 125, so that the driver of the vehicle is in full control of the manner of clutching at all times, to the extent that, when the accelerator is fully depressed in one sudden movement, the third valve III is also opened under the influence of the signal produced by the optocoupler 113 when the light path therein is interrupted by the plate 125 corresponding to the accelerator position, in addition to or instead of the procedure described above where the run-up to full torque is performed. Since the third valve is opened by the control, the air will be able to leave the system with a much smaller resistance, so that the piston moves to the left substantially faster. The third valve remains open as long as the light path is blocked. The clutching range may thus be traversed entirely proportionally to the position of the accelerator pedal or handle, so that the vehicle remains fully under control. The motor will not stall, neither will the vehicle jolt, because power is supplied proportionally. The vehicle, however, will accelerate much more quickly, fitting a more sportsmanlike style of driving, or as may be essential in dealing with an immediate emergency situation.

To switch to a next gear, the accelerator pedal is released and the system is activated again by switch 112, after which a next cycle will be run.

Although the invention was explained with reference to two embodiments only, it will be obvious that the invention is by no means limited to the embodiments given. On the contrary, many variations and modifications are possible to those skilled in the art within the scope of the invention.

Thus instead of a pneumatic system as in the second embodiment, a hydraulic system may be realized in a fully analogous manner. It is also possible to use twoway valves instead of threeway valves, or fewer threeway valves, while retaining the same functions.

Furthermore, the embodiments of the switching means and of the movable elements are also given purely by way of example. However much the embodiments may have proved their reliability and effectivity in practice, alternative embodiments may be used for the switching means and movable elements.

The interrelationship provided between the state of the accelerator and the state of the clutch by the movable elements and the switching means associated therewith, according to the invention, always achieves that both the degree of clutch engagement and the speed with which the clutch is operated can be controlled via the accelerator.

We claim:

1. A device for automatic control of a clutch in a motor vehicle having a motor, the device comprising:

an actuator for automatically controlling operation of the clutch;

control means switchably connected to said actuator for controlling operation of said actuator; and a switch connected between said control means and said actuator, said switch comprising two cooperating parts, a first of said parts mounted on a first movable element whose position is associated with a position of a speed control for the motor and a second of said parts mounted on a second movable element whose position is associated with a degree of engagement of the clutch, said two parts being structured and arranged to connect and disconnect said control means and said actuator depending on relative positions of said first and second movable elements.

2. The device of claim 1, wherein said first movable element's position is responsive to the position of the speed control for the motor and said second movable element's position is responsive to the degree of engagement of the clutch.

3. The device of claim 1, wherein said first and second movable elements are mutually adjustable.

4. The device of claim 1, wherein said first part comprises a flat plate and said second part comprises an optocoupler, and wherein said flat plate is movable into a light path of said optocoupler depending on the relative positions of said first and second movable elements.

5. The device of claim 4, wherein first movable part comprises a first lever and said second movable part comprises a second lever, said first and second levers being hinged at a common point.

6. The device of claim 5, wherein said flat plate is hinged at said common point, said flat plate having a radially extending slot by which said flat plate is adjustable fastened to said first lever.

7. The device of claim 5, wherein an accelerator for the motor acts on said first lever and said actuator and the clutch act on said second lever.

8. The device of claim 5, wherein said actuator comprises a pressure cylinder and an outgoing drive rod, and wherein said drive rod is connected to said second lever.

9. The device of claim 8, further comprising a buffer vessel and electronic valves in communication therewith, and wherein said pressure cylinder comprises a piston movable within said pressure cylinder and combined inlet/outlet openings on either side of said piston, wherein said openings are connected to said buffer vessel through respective ones of said electronic valves.

10. The device of claim 9, further comprising a reducing valve, and wherein at least one of said electronic valves comprises a threeway valve with an outlet coupled to said reducing valve.

11. The device of claim 10, further comprising two more reducing valves with unequal reductions, wherein both of said electronic valves are threeway valves, and wherein one of said inlet/outlet openings is coupled to one of said threeway valves that is coupled to said two more reducing valves through a further threeway valve.

12. The device of claim 5, wherein said first lever comprises a further switch whose position depends on a position of an accelerator for the motor.

13. The device of claim 12, wherein said further switch comprises a further optocoupler and a vane.

14. The device of claim 1, wherein said second movable element comprises a first lever and a second lever that are hinged at a common point.

15. The device of claim 1, wherein said actuator comprises an electric motor with a threaded shaft, a nut carried by said threaded shaft, and a guide parallel to said threaded shaft for preventing rotation of said nut.

16. The device of claim 1, further comprising a connection piece connected to said actuator and to said second movable element, wherein said first part comprises a contact track and said second part comprises a contact mounted in said connection piece that is slidable over said contact track, wherein said first movable element comprises a connection for connecting said first movable element to an accelerator for the motor, and wherein said switch further comprises, a spring for urging said first movable element to a first position when the accelerator is not operated, a first switch element for operating said actuator in a first direction to disengage the clutch, a second switch element for facilitating operation of said actuator in a second direction opposite said first direction when the accelerator is operated causing said first movable element to leave said first position, a first limit switch that deactivates said actuator when the clutch is disengaged, and a second limit switch that deactivates said actuator when the clutch is engaged.

17. The device of claim 16, wherein said actuator comprises a chainwheel and a chain carried by said chainwheel, one end of said chain being connected to said connection piece.

18. The device of claim 17, wherein said second movable element comprises a first lever and a second lever hinged at a common point, and another end of said chain is connected to said second lever.

19. The device of claim 18, further comprising a resilient element, and wherein said resilient element is affixed to said second lever.

20. The device of claim 16, further comprising at least one rod aligned parallel to a direction of movement of said connection piece, said contact track being movable on said rod.

21. A device for automatic control of a clutch in a motor vehicle having a motor, the device comprising:

an actuator for automatically controlling operation of the clutch;

control means switchably connected to said actuator for controlling operation of said actuator; and a switch connected between said control means and said actuator, said switch comprising two cooperating parts, a first of said parts mounted on a first movable element whose position is associated with a position of a speed control for the motor and a second of said parts mounted on a second movable element comprising a first lever and a second lever that are hinged at a common point, said second part being connected to an end of said second lever whose position is associated with a degree of engagement of the clutch, said two parts being structured and arranged to connect and disconnect said control means and said actuator depending on relative positions of said first and second movable elements.

22. A device for automatic control of a clutch in a motor vehicle having a motor, the device comprising:

an actuator for automatically controlling operation of the clutch;

control means switchably connected to said actuator for controlling operation of said actuator; and a switch connected between said control means and said actuator, said switch comprising two cooperating parts, a first of said parts comprising a flat plate mounted on a first movable element whose position is associated with a position of a speed control for the motor and second of said parts comprising an optocoupler mounted on a second movable element whose position is associated with a degree of engagement of the clutch, said flat plate being movable into a light path of said optocoupler depending on the relative positions of said first and second movable elements so as to connect and disconnect said control means and said actuator depending on relative positions of said first and second movable elements.

23. A device for automatic control of a clutch in a motor vehicle having a motor, the device comprising:

an actuator for automatically controlling operation of the clutch;

control means switchably connected to said actuator for controlling operation of said actuator;

a switch connected between said control means and said actuator, said switch comprising two movable elements, a first one of said movable elements having a position that is associated with a position of a speed control for the motor and a second of said movable elements having a position that is associated with a degree of engagement of the clutch;

a connection piece connected to said actuator and to said second movable element; and a contact track mounted on said first movable element and a contact mounted in said connection piece that is slidable over said contact track, said contact track and said contact being structured and arranged to connect and disconnect said control means and said actuator depending on relative positions of said first and second movable elements.

24. The device of claim 23, wherein said switch further comprises a spring for urging said first movable element to a first position when an accelerator for the motor is not operated, a first switch element for operating said actuator in a first direction to disengage the clutch, a second switch element for facilitating operation of said actuator in a second direction opposite said first direction when the accelerator is operated causing said first movable element to leave said first position, a first limit switch that deactivates said actuator when the clutch is disengaged, and a second limit switch that deactivates said actuator when the clutch is engaged.

* * * * *